United States Patent
Darcel et al.

(10) Patent No.: US 9,249,040 B2
(45) Date of Patent: Feb. 2, 2016

(54) PROCESS AND PLANT FOR SLUDGE HYGIENIZATION TREATMENT

(75) Inventors: Loïc Darcel, Versailles (FR); Olivier Bernat, Luisant (FR)

(73) Assignee: AQUALTER DEVELOPPEMENT, Chartres (FR)

( * ) Notice: Subject to any disclaimer, the term of this patent is extended or adjusted under 35 U.S.C. 154(b) by 260 days.

(21) Appl. No.: 14/125,373

(22) PCT Filed: Feb. 2, 2012

(86) PCT No.: PCT/FR2012/000045
§ 371 (c)(1),
(2), (4) Date: Jan. 13, 2014

(87) PCT Pub. No.: WO2012/104509
PCT Pub. Date: Aug. 9, 2012

(65) Prior Publication Data
US 2014/0263046 A1   Sep. 18, 2014

(30) Foreign Application Priority Data
Feb. 4, 2011 (FR) .................................... 11 00351

(51) Int. Cl.
C02F 11/18 (2006.01)
C02F 11/16 (2006.01)
F26B 17/20 (2006.01)

(52) U.S. Cl.
CPC ............. *C02F 11/185* (2013.01); *C02F 11/16* (2013.01); *F26B 17/20* (2013.01); *C02F 2209/02* (2013.01); *C02F 2209/44* (2013.01); *C02F 2303/04* (2013.01); *C02F 2303/10* (2013.01); *F26B 2200/18* (2013.01); *Y02W 10/30* (2015.05); *Y02W 10/37* (2015.05)

(58) Field of Classification Search
CPC .... F26B 2200/18; F26B 17/20; C02F 11/185; C02F 11/16; C02F 2209/02; C02F 2209/44; C02F 2303/04; Y02W 10/30; Y02W 10/37
See application file for complete search history.

(56) References Cited

U.S. PATENT DOCUMENTS

| 4,734,998 A | 4/1988 | Lee et al. |
| 5,122,263 A | 6/1992 | Huber |
| 2002/0043505 A1 | 4/2002 | Olson |
| 2012/0168388 A1 | 7/2012 | Conrad et al. |

FOREIGN PATENT DOCUMENTS

| DE | 20 2009 004860 U1 | 12/2009 |
| DE | 10 2009 033028 A1 | 1/2011 |
| EP | 0 413 940 A | 2/1991 |
| EP | 0 559 012 A1 | 9/1993 |
| EP | 1 621 523 A | 2/2006 |
| FR | 2 904 824 A | 2/2008 |

OTHER PUBLICATIONS

"Evaluation sludge treatments for pathogen reduction", Europ. Commission, DG Environment, Sep. 2001, pp. 1-52, XP002659059, ISBN: 928941734X Retrieved from the Internet: URL:http://ec.europa.eu/environment/waste/sludge/pdf/sludge eval.pdf [retrieved on Sep. 15, 2011] Thermophilic temperatures; p. 11, paragraph 3.1.1—p. 13; tables 4.1,5.1 Selection and application of indicator organisms; p. 31, paragraph 6.1.3 Conclusions: Parameters affecting the kill or inactivation of pathogens; p. 35, paragraph 7.
International Search Report, dated Apr. 19, 2012, from corresponding PCT application.

*Primary Examiner* — Jiping Lu
(74) *Attorney, Agent, or Firm* — Young & Thompson

(57) ABSTRACT

A sludge treatment plant includes an extended floor with a work surface for receiving a mass of spread-out sludge and a movable carriage positioned transversely above the work surface. The movable carriage includes a displacement tool designed to carry the sludge towards a terminal part of the work surface. A withdrawal tool transfers the sludge towards an outlet channel. The outlet channel includes a screw conveyor associated with a rotational drive system and equipped with a heating element. A controller adjusts the temperature in this screw conveyor to a predetermined value between 90° C. and 100° C., while adjusting the rotational drive of the screw conveyor in order to obtain a residence time of the sludge within this screw conveyor to a predetermined value of greater than 4 hours.

18 Claims, 1 Drawing Sheet

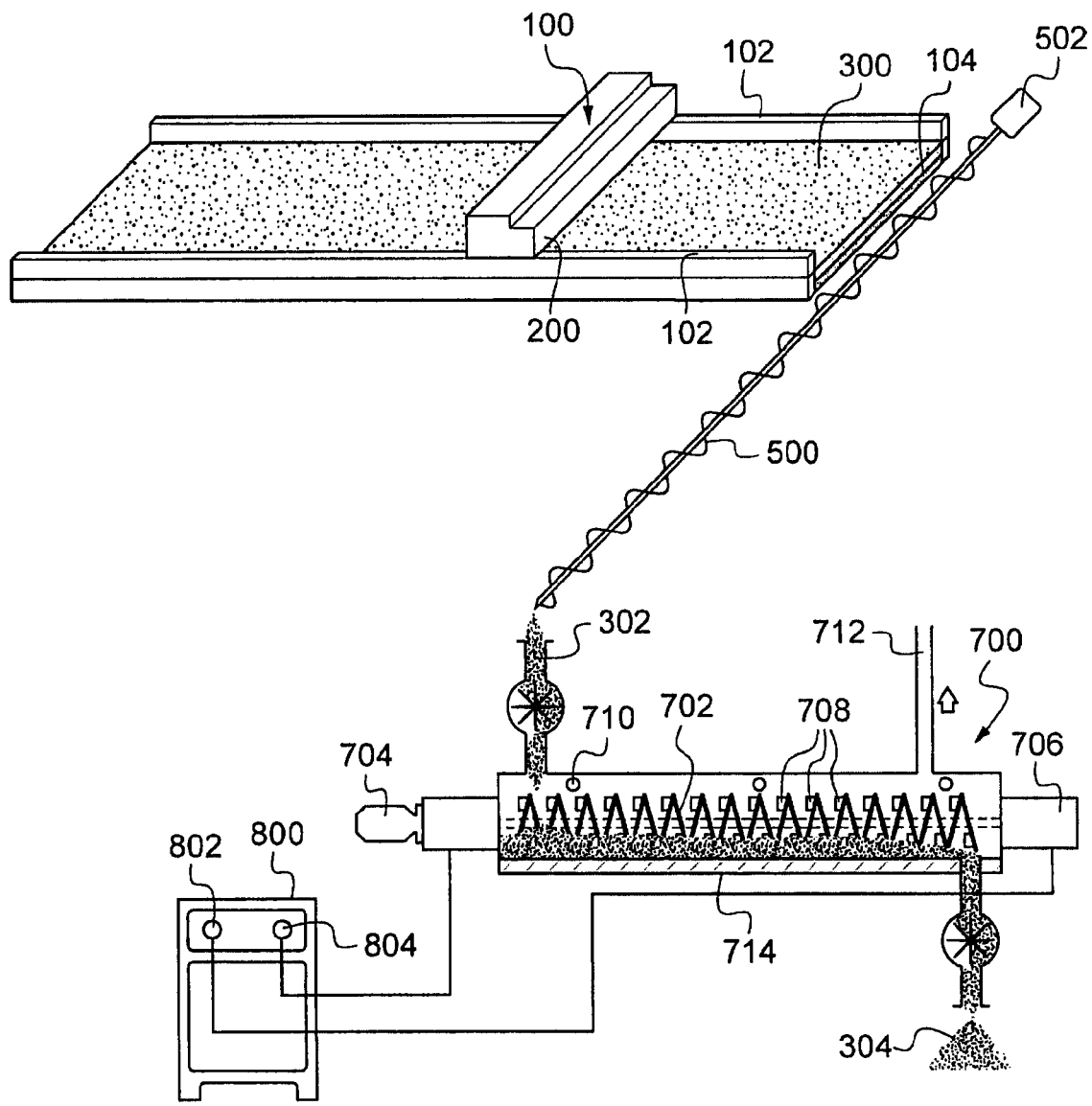

PROCESS AND PLANT FOR SLUDGE HYGIENIZATION TREATMENT

BACKGROUND OF THE INVENTION

1. Field of the Invention

The invention relates to a sludge treatment plant, more particularly, for the hygienization thereof.

2. Description of the Related Art

Many industrial or urban operations generate waste that have to undergo a variety of treatments for various purposes. Wastes from industrial or urban effluent treatment plants or water treatment plants can be cited as examples. These wastes comprise masses composed of biological and physico-chemical sludge.

This type of wastes has to undergo more or less complex treatments, for economical and/or ecological purposes. In addition, some laws set clear and obligatory standards for the treatment of such wastes.

This results in waste treatment being now both widespread and diversified.

The "sludge" part of wastes is a sensitive sector in the field of wastes treatment. Thus, the treatment of sludge for the reuse thereof conventionally comprises thickening, dewatering and drying if necessary, in some installations.

Sludge drying appears as an important step since it more particularly makes it possible to significantly reduce the volume of sludge. A small volume is important as regards storage, transportation and/or disposal.

It should be understood that "dried sludge" means sludge the moisture content of which does not exceed about 30%. As a matter of fact, it is important to obtain a compact sludge product the integral structure of which is not damaged and keeps a granular appearance. Some left moisture is appropriate. In fact, too dry a sludge product may contain a large amount of dusty materials. Any form of dust is generally unsuitable for transport, storage or reclaiming.

So-called thermal drying facilities which implement air drying in a closed circuit comprising a moisture exhaust are more particularly known. Solar drying facilities are also known which have an advantage in terms of investment and operation costs that are much more attractive than those of thermal drying.

To optimize the implementation or to save energy, the state of the art provides for various drying facilities and/or processes.

Document WO 2004/020922 A1 discloses a device for drying and turning sludge. To avoid forced ventilation positioned on the greenhouse roof, the device comprises frame-mounted driven fans that are directly positioned on means ensuring the turning of sludge. The fans ensure the renewal of air in the greenhouse.

Document EP 0413940 A discloses an installation comprising a pressing device for dewatering sludge and thus improving the drying.

But the sludge treated by the facilities of the prior art is not directly compatible with a use in critical technical fields as regards health.

Other fields, such as agriculture, require a strict spreading plan to be able to reclaim the sludge generated by drying facilities. As a matter of fact, the sludge generated by drying facilities and used in agriculture is treated as "waste". A risk management procedure aiming at the capacity of a system to self-purify not being exceeded should therefore be provided for. The implementation of this management procedure is sometimes complex.

The amount of uni- or multicellular organisms present in the sludge must be checked ahead to avoid spreading plans. This includes checking the amounts of pathogenic agents, bacteria, yeasts, fungi, including molds, multicellular organisms and eggs thereof.

This is the reason why some sludge undergoes a so-called hygienization treatment to extend their scope of application after a simple drying. This hygienization takes place after drying in separate facilities. The aim is to provide so-called approved sludge as a fertilizer material in the end. Such approved sludge is ready for use in sensitive technical fields or in agriculture, without strict spreading plans having to be provided for.

The agricultural sector is experiencing the problem of pathogenic agents. The most common and difficult to eliminate agents are:

tThe bacteria of the Enterobacteriaceae family such as *Escherichia coli* or of the *Salmonella* type;

the bacteria of the Clostridiaceae family such as *Clostridium perfringens;* the bacteria of the Enterococcaceae family such as *Enterococcus faecalis;* the bacteria of the Staphylococcaceae family such as *Staphylococcus aureus;*

The bacteria of the Listeriaceae family such as *Listeria monocytogenes;* the eggs of *Nematoida* (or *Nematoda*); or the virus of the Enterovirus type.

To eliminate these pathogenic agents from dried sludge, the state of the art provides methods which are generally difficult to implement and/or involve high investment and processing costs.

Document EP 1 621 523 discloses a method using high temperature static and thermal heating. The document also mentions hygienization of sludge at 50° C. for 1 month.

Document FR 2 904 824 describes a microwave hygienization treatment.

It should be noted that the energy balance increases with the complexity of the process implemented. It is therefore important to find a balance between as simple as possible an implementation and a satisfactory energy balance, while taking into account the imposed health regulations.

In addition, the techniques of the prior art do not enable a satisfactory elimination of the bacteria of the Clostridiaceae family.

SUMMARY OF THE INVENTION

The present invention aims at improving the situation.

For this purpose, the invention introduces a sludge treatment plant, comprising an extended floor with a work surface for receiving a mass of spread-out sludge, a movable carriage positioned transversely above the work surface and comprising a drive system for moving the carriage in longitudinal translation above the floor, said carriage comprising a displacement tool designed to continuously carry the sludge towards a terminal part of said work surface, a sludge withdrawal tool positioned at the terminal part of said work surface, to transfer the sludge to an outlet channel. The outlet channel of the plant of the invention comprises a screw conveyor arranged in interaction with the withdrawal tool, said screw conveyor being provided with a heating means, and being associated with a rotational drive system. The outlet channel of the plant of the invention also includes a controller jointly arranged to adjust heating in the screw conveyor to obtain a sludge temperature between 90° C. and 100° C., while adjusting the rotational drive of the screw conveyor to obtain a residence time of the sludge within this screw conveyor substantially to a predetermined value greater than 4 hours.

According to one embodiment, the screw conveyor is a coreless screw type.

According to one embodiment, the heating means may include circulating a heat transfer fluid within the screw conveyor. In another embodiment, the screw conveyor is provided with heating resistors. Advantageously, the screw conveyor is made of a conductive material. In general, the heating means known in the art may be built-in to cooperate with the screw conveyor.

According to one embodiment, said screw conveyor has a length of about 6000 mm and a diameter between 300 mm and 600 mm. Said screw conveyor may include a helical turn and include mixing paddles.

According to one embodiment, the controller is so arranged as to adjust the temperature of the sludge within the screw conveyor substantially at a predetermined value of 95° C. The controller may adjust the temperature of the screw conveyor substantially at a predetermined value of 105° C.

The screw conveyor may be accommodated in a housing comprising at least one temperature sensor. In one embodiment the controller is so arranged as to control a rotational speed between 0.12 and 0.26 rpm.

The screw conveyor may be rotated by a drive motor.

The invention also relates to a sludge treatment method comprising the following steps of:

a. receiving a mass of spread-out sludge on the work surface of a floor, b. moving in longitudinal translation a movable carriage transversely positioned above the work surface and conveying said sludge to a terminal part of said work surface, c. withdrawing the sludge in the terminal part of the work surface and transferring same to a screw conveyor provided with a heating means of a type comprising heat transfer fluid circulation or of a type comprising at least one heating resistor, d. adjusting heating in the screw conveyor to obtain a temperature of the sludge between 90° C. and 100° C., and e. adjusting the drive of the screw conveyor to obtain a residence time of the sludge within the screw conveyor substantially to a predetermined value greater than 4 hours.

In step d. the temperature of the screw conveyor is preferably adjusted to obtain a temperature of the sludge of 95° C. For this purpose, the temperature of the screw conveyor may be adjusted to 105° C.

The screw conveyor drive may be adjusted to a rotational speed between 0.12 and 0.26 rpm so as to obtain a residence time of the sludge within the screw conveyor substantially at a predetermined value between 5 and 8 hours, preferably 6 hours.

The method of the invention may advantageously comprise a step of mixing the sludge. This mixing is continuously carried out during the residence time of the sludge within said screw conveyor.

BRIEF DESCRIPTION OF THE DRAWING FIGURES

Other features and advantages of the invention will become apparent upon reading the following detailed description and the appended drawing wherein:

FIG. 1 shows a block diagram of a plant for the hygienization treatment of sludge according to one embodiment of the invention.

The drawings and the description below essentially contain elements having a special nature. They belong to the description, and thus may not only be used to have the present invention better understood, but also contribute to the definition thereof, if need be.

DETAILED DESCRIPTION OF THE INVENTION

FIG. 1 shows a sludge treatment plant comprising a system for sludge hygienization.

The plant comprises a floor 104 having a work surface for receiving a mass of spread sludge 300. "work surface" substantially means the part of the floor 104 forming a sludge bed 300. It is essentially a generally rectangular flat surface so arranged as to accommodate the sludge 300 for drying purposes. The sludge 300 may be provided by a feed screw positioned in the inlet channel.

Guide rails 102 are arranged substantially along the floor 104, i.e. parallel to the latter and parallel to each other. From another point of view, the guide rails 102 are positioned longitudinally on either side of the work surface.

A drive system may be arranged along the guide rails 102 for moving a movable carriage 100 above the work surface. The movable carriage 100 is positioned transversely above said work surface and is so arranged as to perform a movement in longitudinal translation above the floor 104 by bearing on the guide rails 102.

The movable carriage 100 carries a withdrawal tool 200. The displacement tool 200 may be of the turning tool type comprising paddles. This tool has a double main function: drying the sludge and moving the sludge to a terminal part of the work surface of the floor 104.

The displacement tool 200 is positioned transversely to the work surface of the floor 104 and continuously moves the sludge 300 toward a terminal part of the work surface of the floor 104, while drying same.

The displacement tool 200 is so arranged as to be in contact with the sludge mass 300 located on the work surface. More specifically, the displacement tool 200 is almost in contact with the floor in order to ensure the function of moving the sludge at best. However, a safety space must be provided between the displacement tool 200 and the floor 104 to avoid catching.

As mentioned above, the displacement tool 200 is carried by the carriage 100 which moves together with the tool 200 in longitudinal translation above the floor 104. The mass of sludge 300 on the working surface is thus pressed over the entire length of the floor 104 by the displacement tool 200. A working direction is predetermined from an inlet channel to an outlet channel. The displacement tool performs the function of continuously moving the sludge 300 from the inlet channel to a terminal part of the work surface of the floor 104.

The floor 104 may be of more or less complex nature and may more particularly be of the heated floor type.

According to one embodiment of the invention, the floor comprises a heating system with heat recovery from the treatment plant effluents.

The sludge leaving the work surface may be described as dried sludge, i.e. having a moisture content not exceeding 30% and preferably 20%.

The device of the invention also includes a withdrawal tool 500 positioned adjacent to the terminal part of said work surface.

According to one embodiment, the withdrawal tool 500 may be a screw rotated by a drive motor 502.

The withdrawal tool 500 is so arranged as to transfer the sludge 300 from the terminal part of the work surface to an outlet channel.

According to the invention, the outlet channel includes a screw conveyor 700. More specifically, the screw conveyor 700 is positioned to interact with the withdrawal tool 500 to receive the dried sludge from the work surface.

The screw conveyor 700 is preferably a screw of the coreless screw type (also called "shaftless screw") to facilitate the transportation (conveying) of the product moved by said screw. This type of screw consists of a continuous helical turn 702.

Said screw conveyor 700 is provided with a heating means 706. According to one embodiment, the turn 702 is made of a conductive material, such as stainless steel, preferably 304 stainless steel. Thus, heat may be applied to a selected place of said turn 702 for heating thereof.

According to the invention the screw conveyor 700 is so arranged as to be brought to a predetermined temperature between 90° C. and 110° C., preferably at 105° C. As a matter of fact, increasing the temperature of the sludge 300 to approximately between 90° C. and 100° C. is planned. This is achieved by heat conduction and heat transfer from the screw conveyor 700 to the sludge 300. In other words, it is intended to regulate the heating in the screw conveyor to obtain a sludge temperature between 90° C. and 100° C.

Preferably the temperature of the sludge is raised to 95° C. In this preferred embodiment, the screw 700 is adjusted to a temperature substantially equal to 105° C.

Advantageously, the screw conveyor 700 is accommodated in a housing 714 for good thermal insulation and to ensure the most sensitive heat transfer from the screw conveyor 700 to the sludge 300.

The insulation in a housing 714 makes it possible to improve the heat transfer between the screw conveyor 700 and the sludge. Thus, with good insulation, there is almost no loss in terms of heat transfer. Accordingly, when the screw conveyor 700 is raised to a temperature between 90° C. and 100° C., the sludge is also heated.

The housing 714 may comprise one or more temperature sensors 710 to adjust the ambient temperature of the sludge 300 and optionally to adjust the temperature of the screw conveyor 700. Preferably, one or more sensors is/are provided to sense the temperature of the sludge at various locations on the conveying path thereof.

According to the invention, the screw conveyor 700 is driven by a rotational drive system 704. The system may be a drive motor.

The plant of the invention further comprises a controller 800 so arranged as to adjust the temperature of the sludge within the screw conveyor substantially at a predetermined value between 90° C. and 100° C., preferably at 95° C. while adjusting the drive rotating the screw to obtain a residence time of the sludge within the screw conveyor of a predetermined value substantially greater than 4 hours and preferably between 5 and 8 hours.

A temperature controller 802 enables to adjust the temperature and/or set the temperature of the screw conveyor 700. The temperature controller 802 is connected to the heating means 706.

According to one embodiment, the housing 714 includes a thermostat in connection with the temperature probe(s). This allows to check in real time the temperature of the sludge and to adjust the temperature of the screw conveyor 700 as needed.

A rotation speed controller 804 enables to adjust and/or set the rotational speed (rpm) of the screw conveyor 700. The rotation speed controller 804 is connected to the rotational drive system 704.

According to one embodiment, the turn 702 may be equipped with mixing paddles 708. Mixing paddles 708 are positioned on the turn 702 to produce in particular a mixing of the sludge and to improve the heat transfer coefficient between the screw conveyor 700 and the sludge and additionally ensure a uniform treatment of the sludge.

The Applicant has found that mixing the sludge in combination with heating same provides a good hygienization of said sludge.

Thus, the sludge treatment method according to the invention may further comprise a step of mixing said sludge, with this step being active during said time of residence of the sludge within said screw conveyor.

To drain the gas accumulating in the housing 714, a gas outlet 712 is provided. The gases may be sucked and sent to a facility for deodorization purposes.

FIG. 1 schematically shows the continuous flow of the sludge 300. The raw and wet sludge 300 is brought onto the work surface of the floor 104. When the sludge has dried, namely, when it has reached a moisture content not exceeding 30%, it is withdrawn using the withdrawal tool 500. The dried sludge 302 then undergoes hygienization using the screw conveyor 700. At the outlet of the screw conveyor 700, the sludge may be called hygienized sludge 304.

The Applicant surprisingly found that applying a predetermined temperature to the sludge using the screw conveyor 700, for a period substantially ranging from 4 hours to 10 hours, eliminates pathogenic agents, bacteria, yeasts, fungi, including molds, multicellular organisms and eggs thereof from said sludge. Thus, the device of the invention and the method of use thereof allow effective hygienization of sludge generated by water treatment plants.

Table I shows the microbiological analyses of dried sludge, respectively before and after hygienization using the present invention. The table shows the comparison with a French standard in force for the approval of fertilizers (for further information, the reader is invited to refer to the CERFA No. 50644 #01 form).

TABLE I

| Micro-organisms pathogenic to humans and animals | Sludge before treatment | Sludge after treatment |
| --- | --- | --- |
| *Escherichia coli* [for 1 g of raw material] | 6.90E+04 | <100 |
| *Clostridium perfringens* [for 1g of raw material] | 2.60E+06 | <10 |
| *Enterococci* [for 1g of raw material] | 5.50E+04 | <23 |
| Coagulase *Staphylococcus* [for 1g of raw material] | Variable | <10 |
| *Listeria monocytogenes* [for 25 g of raw material] | Variable | None |
| Nematodes (eggs) [for 25 g of raw material] | Variable | None |
| Nematodes (larvae) [for 25 g of raw material] | Variable | None |
| *Salmonella* [for 25 g of raw material] | Present | None |
| Yeasts and molds with confirmation of Aspergiiius [for 1g of raw material] | Variable | About 10 |
| *Aspergillus* [for 1 g of raw material] | Variable | <10 |

The table shows that the sludge after treatment may be called hygienized. The sludge is particularly consistent with Approval criteria as defined by the CERFA No. 50644 #01 form.

The invention claimed is:

1. A sludge treatment plant, comprising
an extended floor with a work surface for receiving a mass of spread-out sludge;
a movable carriage positioned transversely above the work surface and comprising a drive system for moving the carriage in longitudinal translation above the floor, said carriage comprising a displacement tool designed to continuously carry the sludge towards a terminal part of said work surface; and
a sludge withdrawal tool positioned at the terminal part of said work surface, to transfer the sludge to an outlet channel,
wherein the outlet channel comprises
a screw conveyor arranged in interaction with the withdrawal tool, said screw conveyor being provided with a heating means in particular of a type comprising heat transfer fluid circulation or of a type comprising at least one heating resistor, and being associated with a rotational drive system, and
a controller jointly arranged to adjust heating in the screw conveyor to obtain a sludge temperature between 90° C. and 100° C., while adjusting the rotational drive of the screw conveyor to obtain a residence time of the sludge within this screw conveyor substantially to a predetermined value of 4 to 10 hours.

2. The sludge treatment plant according to claim 1, wherein said screw conveyor is a coreless screw.

3. The sludge treatment plant according to claim 1, wherein said screw conveyor comprises a helical turn.

4. The sludge treatment plant according to claim 1, wherein said screw conveyor comprises mixing paddles.

5. The sludge treatment plant according to claim 1, wherein the controller is so arranged as to adjust the temperature of the sludge within the screw conveyor substantially at a predetermined value of 95° C.

6. The sludge treatment plant according to claim 1, wherein the controller is so arranged as to adjust the temperature of the screw conveyor substantially at a predetermined value of 105° C.

7. The sludge treatment plant according to claim 1, wherein said screw conveyor is accommodated in a housing comprising at least a temperature sensor.

8. The sludge treatment plant according to claim 1, wherein the controller is so arranged as to control a rotational speed between 0.12 and 0.26 rpm.

9. The sludge treatment plant according to claim 1, wherein said screw conveyor is rotated by a drive motor.

10. A sludge treatment method comprising the following steps of:
a. receiving a mass of spread-out sludge on the work surface of a floor;
b. moving in longitudinal translation a movable carriage transversely positioned above the work surface and conveying said sludge to a terminal part of said work surface;
c. withdrawing the sludge in the terminal part of the work surface and transferring same to a screw conveyor provided with a heating means of a type comprising heat transfer fluid circulation or of a type comprising at least one heating resistor;
d. adjusting heating in the screw conveyor to obtain a temperature of the sludge between 90° C. and 100° C.; and
e. adjusting the drive of the screw conveyor to obtain a residence time of the sludge within the screw conveyor substantially to a predetermined value of 4 to 10 hours.

11. The sludge treatment method according to claim 10, wherein in step d. the temperature of the screw conveyor is adjusted to obtain a temperature of the sludge of 95° C.

12. The sludge treatment method according to claim 11, wherein in step d. the temperature of the screw conveyor is adjusted to 105° C.

13. The sludge treatment method according to claim 11, wherein the screw conveyor drive is adjusted to a rotational speed between 0.12 and 0.26 rpm.

14. The sludge treatment method according to claim 11, further comprising a step of mixing said sludge, which is active during said residence time of the sludge within said screw conveyor.

15. The sludge treatment method according to claim 10, wherein in step d. the temperature of the screw conveyor is adjusted to 105° C.

16. The sludge treatment method according to claim 10, wherein the screw conveyor drive is adjusted to a rotational speed between 0.12 and 0.26 rpm.

17. The sludge treatment method according to claim 10, wherein the drive of the screw conveyor is adjusted to provide a residence time of the sludge in the screw conveyor substantially at a predetermined value between 5 and 8 hours, preferably 6 hours.

18. The sludge treatment method according to claim 10, further comprising a step of mixing said sludge, which is active during said residence time of the sludge within said screw conveyor.

* * * * *